US011575745B2

(12) United States Patent
Tatiparthi et al.

(10) Patent No.: US 11,575,745 B2
(45) Date of Patent: Feb. 7, 2023

(54) DYNAMIC FEEDBACK TECHNIQUE FOR IMPROVING DISASTER RECOVERY REPLICATION PERFORMANCE

(71) Applicant: Nutanix, Inc., San Jose, CA (US)

(72) Inventors: Kiran Tatiparthi, Dublin, CA (US); Niranjan Sanjiv Pendharkar, Maharashtra (IN); Shubham Sharma, Maharashtra (IN)

(73) Assignee: Nutanix, Inc., San Jose, CA (US)

( * ) Notice: Subject to any disclaimer, the term of this patent is extended or adjusted under 35 U.S.C. 154(b) by 205 days.

(21) Appl. No.: 17/184,789

(22) Filed: Feb. 25, 2021

(65) Prior Publication Data

US 2022/0217204 A1 Jul. 7, 2022

(30) Foreign Application Priority Data

Jan. 5, 2021 (IN) .............................. 202141000363

(51) Int. Cl.
*H04L 67/1095* (2022.01)
*G06F 9/455* (2018.01)
*H04L 67/1008* (2022.01)

(52) U.S. Cl.
CPC ...... *H04L 67/1095* (2013.01); *G06F 9/45558* (2013.01); *H04L 67/1008* (2013.01);
(Continued)

(58) Field of Classification Search
CPC ............. H04L 67/1008; H04L 67/1095; G06F 9/45558; G06F 2009/45583; G06F 2009/45595
See application file for complete search history.

(56) References Cited

U.S. PATENT DOCUMENTS 6,888,824 B1 5/2005 Fang et al.
7,391,786 B1 6/2008 Prasad et al.
(Continued)

OTHER PUBLICATIONS

Cano, Ignacio, "Curator: Self-Managing Storage for Enterprise Clusters" University of Washington; published Mar. 2017; pp. all.
(Continued)

*Primary Examiner* — Frantz B Jean
(74) *Attorney, Agent, or Firm* — Cesari and McKenna, LLP (57) ABSTRACT

A dynamic feedback technique improves data replication performance by balancing rates of data retrieval and data transmission of a fragmented virtual disk replicated between nodes of clusters on a local site and a remote site of a disaster recovery environment. Each node is embodied as a physical computer with hardware resources, such as processor, memory, network and storage resources, which are virtualized to provide support for one or more user virtual machines executing on the node. The storage resources include storage devices of an extent store, whereas the network includes a wide area network connecting the local and remote sites. The dynamic feedback technique employs a virtual memory buffer configured to balance the data storage retrieval and network transmission rates at a source of replication based on bandwidth demands of the extent store and network throughput as manifested by an available free space (i.e., emptiness) of the virtual buffer.

32 Claims, 8 Drawing Sheets

(52) U.S. Cl.
CPC .............. *G06F 2009/45583* (2013.01); *G06F 2009/45595* (2013.01)

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron et al. |
| 9,009,106 B1 | 4/2015 | Aron et al. |
| 9,069,708 B2 | 6/2015 | Gill et al. |
| 9,336,132 B1 | 5/2016 | Aron et al. |
| 9,652,265 B1 | 5/2017 | Narayanasamy et al. |
| 9,747,287 B1 | 8/2017 | Bhardwaj et al. |
| 9,772,866 B1 | 9/2017 | Aron et al. |
| 10,379,963 B2 * | 8/2019 | Bhargava ............ G06F 11/1458 |
| 11,487,468 B2 * | 11/2022 | Gupta |
| 2010/0049798 A1 * | 2/2010 | McCabe ............ G06F 11/1451 709/227 |
| 2010/0333116 A1 * | 12/2010 | Prahlad ............... G06F 16/1844 713/153 |
| 2021/0382797 A1 * | 12/2021 | Tatiparthi ............ G06F 9/45558 |

OTHER PUBLICATIONS

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible" from https://nutanixbible.com/ Sep. 17, 2019 pp. all.

* cited by examiner

DYNAMIC FEEDBACK TECHNIQUE FOR IMPROVING DISASTER RECOVERY REPLICATION PERFORMANCE

CROSS-REFERENCE TO RELATED APPLICATIONS

The present application claims the benefit of India Provisional Patent Application Serial No. 202141000363 filed on Jan. 5, 2021, by Kiran Tatiparthi, et al. for DYNAMIC FEEDBACK TECHNIQUE FOR IMPROVING DISASTER RECOVERY REPLICATION PERFORMANCE, which is hereby incorporated reference.

BACKGROUND

Technical Field

The present disclosure relates to data replication and, more specifically, to data replication of a fragmented virtual disk between nodes of clusters at a local site and a remote site of a disaster recovery (DR) environment.

Background Information

Virtualization may provide a storage abstraction, such as a virtual disk (vdisk), which may be exposed as a storage object and mounted as a disk on, e.g., one or more virtual machines running on nodes of a cluster so as to appear "virtually" as local storage. Physical storage may be likewise abstracted as the vdisk corresponding to a virtual address space (e.g., of storage blocks) of an extent store exposed as the disk to the virtual machines. The address space may be divided into contiguous address blocks that may fragment over time as new data is written to portions of the address space breaking up the contiguous address blocks. This is especially due to creation of snapshots of the vdisk that require retention of original blocks with greater contiguous address ranges. As a result, a substantial amount of metadata may be needed to describe extents underlying the blocks as the vdisk fragments. Moreover, the data content of the extents may be stored randomly at various physical locations of storage devices of the extent store. When reading data of the extents for a fragmented vdisk, a substantial amount of input/output (I/O) accesses may be necessary, thereby introducing increased I/O latencies. The random storage of data associated with vdisk fragmentation may lead to an increase in metadata overhead and data access time, resulting in a decrease in read performance.

Replication of fragmented vdisks between local and remote sites of a disaster recovery environment may also be burdened by inefficient use of resources to maintain the replication that is often transmitted over a network, such as a wide area network (WAN). The WAN may span long distances typically having variable latencies due to, e.g., packets traversing intermediate stations connecting the physical network wires/cables, as well as dropping of the packets, etc. When the rate of data transmission over the network is slower than the rate of data retrieval (e.g., I/O accesses such as reads from the extent store), then the extent store may be overburdened by continuously servicing the replication data. Overburdening of the extent store may delay serving of I/O accesses for other services, as well as consume hardware resources including greater amounts of memory prior to transmission over the network. Accordingly, there is a need to balance the rate of data retrieval with the rate of data transmission during replication of fragmented vdisks between local and remote sites.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a dynamic feedback technique configured to improve data replication performance by balancing rates of data retrieval and data transmission of a fragmented virtual disk replicated between nodes of clusters on a local site and a remote site of a disaster recovery (DR) environment. Each node is illustratively embodied as a physical computer with hardware resources, such as processor, memory, network and storage resources, that are virtualized to provide support for one or more user virtual machines (UVM) executing (running) on a node. The storage resources include storage devices of an extent store, whereas the network includes a wide area network connecting the local and remote sites. The dynamic (real-time) feedback technique employs a virtual memory buffer configured to balance the data retrieval and transmission rates at a source of replication according to input/output (I/O) access (e.g., read access) demands on the extent store (e.g., a number of read accesses and aggregate extent store bandwidth) and network throughput as manifested by an available free space (i.e., emptiness) of the virtual buffer.

In an embodiment, the technique may employ existing memory buffer capacity deployed in a storage (read) subsystem and a network subsystem as the virtual memory buffer to balance data storage retrieval with network transmission by controlling use of the existing (actual) buffer capacity represented as an available free space of the virtual memory buffer. Notably, the virtual memory buffer is an aggregation of actual buffer capacity in the read and network subsystems without allocation or reservation from other specific memory of the local site. As such, the data retrieval and transmission rates (e.g., throughput) of the read and network subsystems are controlled by a single quantity, i.e., the available free space of the virtual memory buffer.

Illustratively, the virtual memory buffer may be represented as having a fixed sized and configured to store a predetermined amount of data. In response to an instruction issued by an application running on the UVM to initiate DR replication, the read subsystem at the source of replication (i.e., the local site) loads data of a fragmented virtual disk (vdisk) retrieved from the extent store into the virtual memory buffer. Loading of the fragmented vdisk may involve a large number of read accesses according to an amount of fragmentation of the vdisk. The network subsystem of the local site then forwards the loaded data from the virtual memory buffer to the network for transmission to a destination of replication (i.e., the remote site). According to the technique, the emptiness of the virtual buffer may be determined by the rate at which the network subsystem is able to transmit the data over the network to the remote site which, in turn, determines the rate at which data is retrieved by the read subsystem from the extent store. Essentially, a rate of data retrieval from the extent store is controlled in proportion to the emptiness of the virtual memory buffer, which provides real-time feedback to the read subsystem from the network subsystem. That is, a current throughput of the network determines the emptiness (e.g., an amount of free space) of the virtual buffer which drives demand for the read subsystem to retrieve data from the vdisk.

For example, if the virtual memory buffer is substantially empty because the data transmission rate of the network is high (fast) (i.e., actual network buffers forming part of the virtual buffer are empty), the read subsystem may increase the data retrieval rate by, e.g., issuing more I/O accesses, such as read operations, to the extent store. The read subsystem may service I/O accesses from different sources such that the extent store may be unable to handle (process) the increased rate of read operations and, as a result, may become congested or saturated. In response, a congestion avoidance algorithm may be invoked to adjust (control) the rate at which data can be suitably retrieved from the extent store, as well as the read demand made to the read subsystem as determined from the emptiness of the virtual buffer. Notably, both the congestion avoidance algorithm and balance of data storage retrieval with network data transmission may be driven by the emptiness of the virtual buffer. In an embodiment, the congestion avoidance algorithm is an additive-increase/multiplicative-decrease (AIMD) algorithm, although other congestion avoidance algorithms may be advantageously used with the embodiments herein.

According to the technique, the emptiness (i.e., a degree of free space) of the virtual memory buffer may be manifested as either a percentage or numerical amount of free space in the virtual buffer using values that are determined and processed by the read subsystem. Illustratively, the values include a maximum value (M-Max) of the virtual memory buffer and an amount of data to send to the network subsystem (M-to-Send). The read subsystem uses these values to arrive at the virtual buffer emptiness, illustratively calculated as (M-Max)−(M-to-Send), which operates as an error feedback to drive the demand to the read subsystem. As such, these calculations are used to drive a dual-level feedback mechanism of the technique, wherein a primary level involves feedback of the real time (dynamically changing) emptiness of the virtual memory buffer to control read demand to the read subsystem and a secondary level that involves feedback configured to control the read subsystem performance (e.g., I/O access rate) to the extent store using the congestion avoidance algorithm. In effect, the emptiness of the virtual buffer (e.g., expressed as M-Max minus M-to-Send) drives the dual-level feedback mechanism.

Advantageously, the dynamic feedback technique described herein improves DR replication performance and optimizes resource utilization through direct feedback from a network subsystem to a read subsystem at the source of replication, specifically without need of additional memory resources other than those existing in the read and network subsystems.

DESCRIPTION

Figure 1:
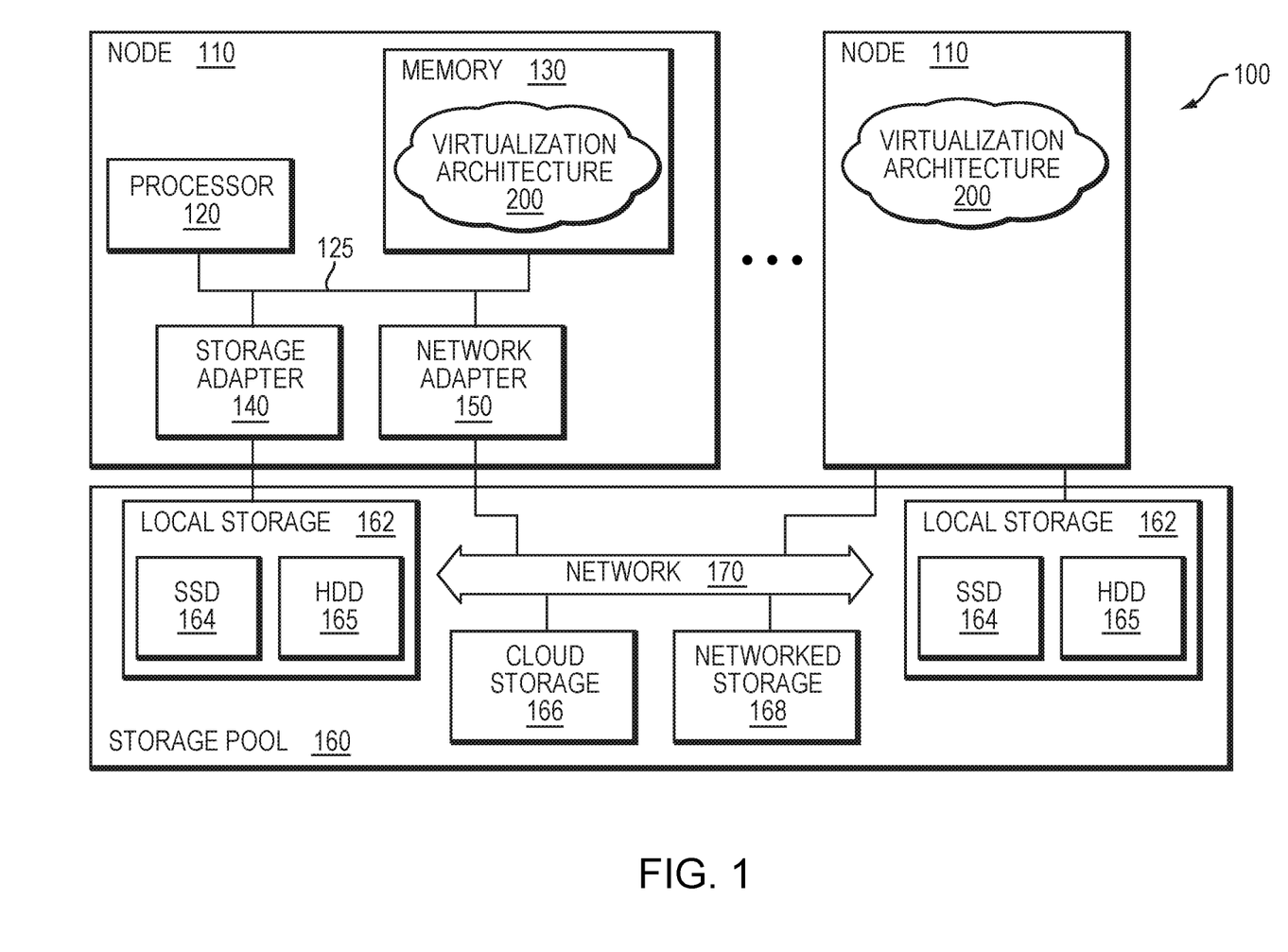
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOLS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the cluster 100 ("local site") and a remote cluster ("remote site") over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may he embodied as network attached storage (NAS) or storage area network (SAN) and include combinations of storage devices (e.g., SSDs and/or HDDs) from the storage pool 160. Communication over the network may be effected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS) may also be advantageously employed.

The main memory 120 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
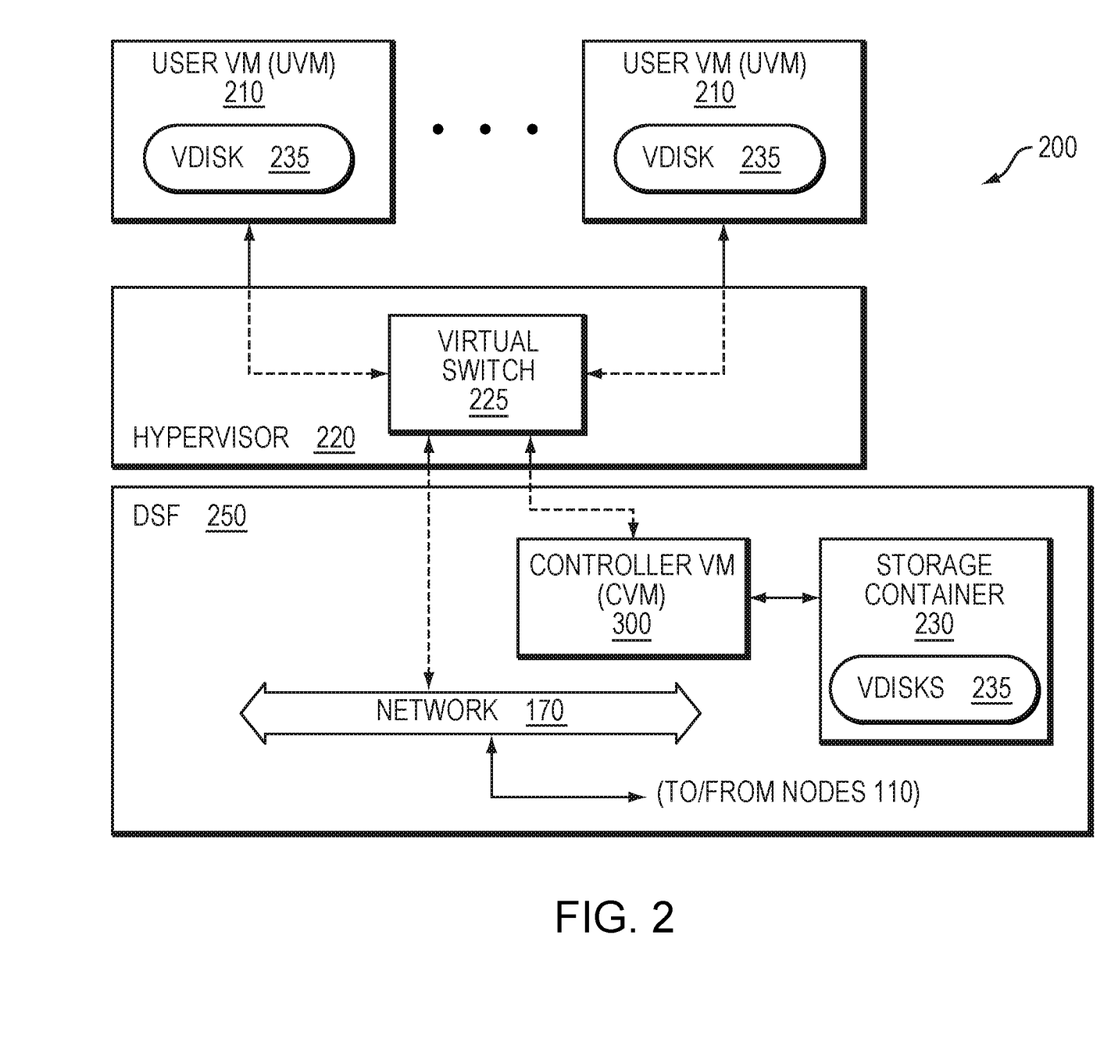
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the U VMs 210. In an embodiment, the hypervisor 220 is illustratively the Nutanix Acropolis Hypervisor (AHV), although other types of hypervisors, such as the Xen hypervisor, Microsoft's Hyper-V RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

The client software (e.g., applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI, CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably the IP-based storage protocol request packets may remain in the node 110 when the communication the request and the response begins and ends within the hypervisor 220. In other embodiments, the IP-based storage protocol request may be routed by the virtual switch 225 to a CVM 300 on another node of the same or different cluster for processing. Specifically, the IP-based storage protocol request is forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
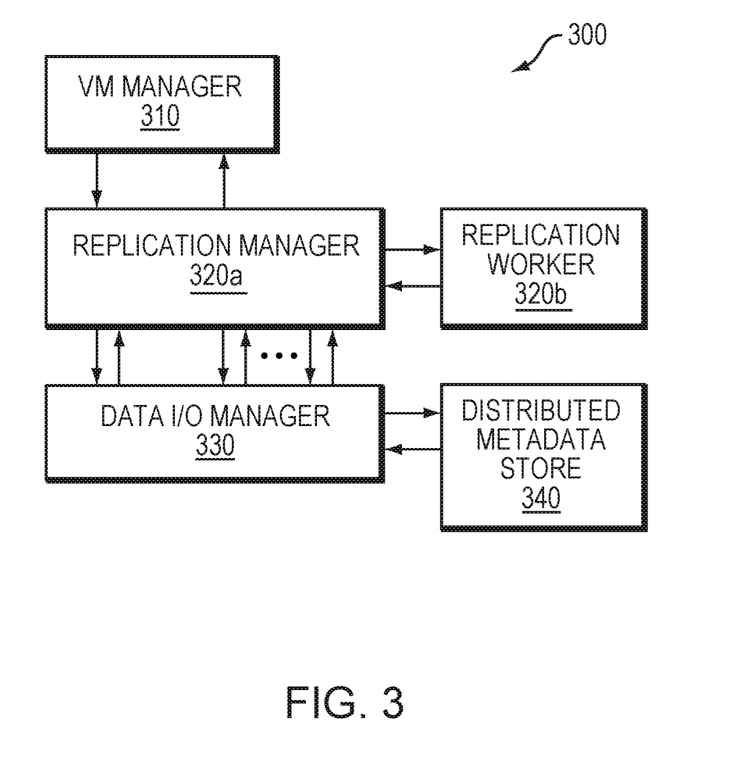
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack that may be decomposed into a plurality of threads running in a user space of the operating system of the CVM to provide storage and I/O management services within DSF 250. In an embodiment, the user mode processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A replication manager 320a is configured to provide replication and disaster recovery capabilities of DSF 250. Such capabilities include migration/failover of virtual machines and containers, as well as scheduling of snapshots. In an embodiment, the replication manager 320a may interact with one or more replication workers 320b. A data I/O manager 330 is responsible for all data management and I/O operations in DST 250 and provides a main interface to/from the hypervisor 220, e.g., via the IP-based storage protocols. Illustratively, the data I/O manager 330 presents a vdisk 235 to the UVM 210 in order to service I/O access requests by the UVM to the DFS. A distributed metadata store 340 stores and manages all metadata in the node/cluster, including metadata structures that store metadata used to locate (map) the actual content of vdisks on the storage devices of the duster.

Figure 4:
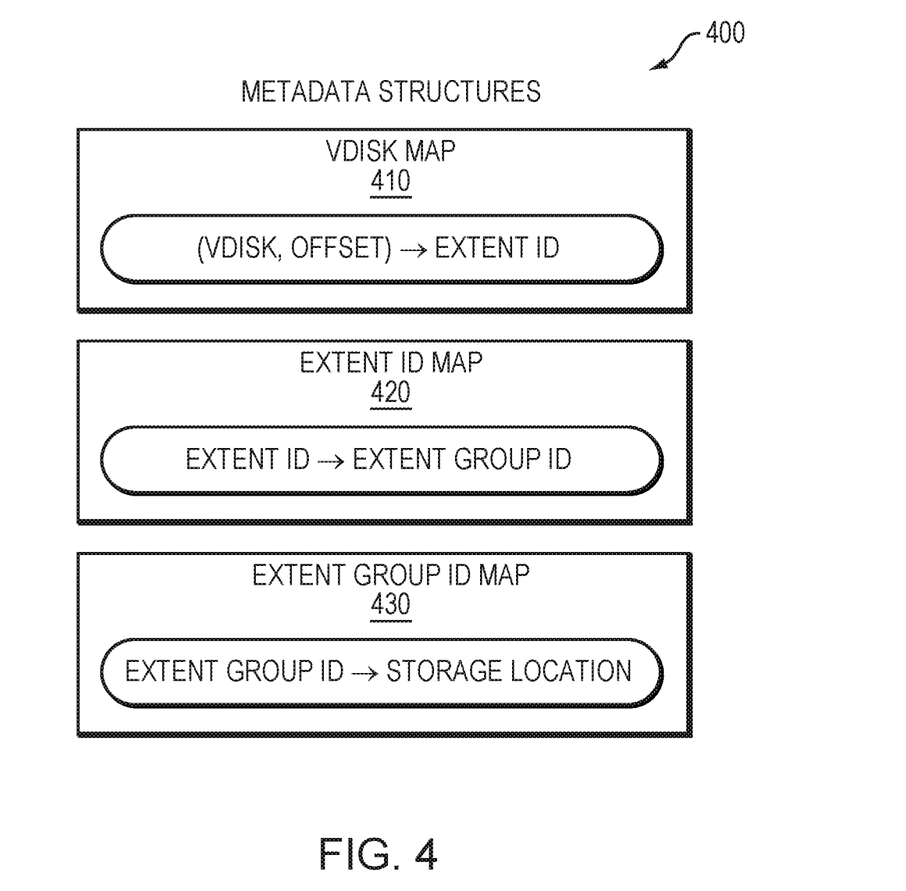
FIG. 4 is a block diagram of metadata structures used to map virtual disks (vdisks) of the virtualization architecture.

FIG. 4 is block diagram of metadata structures 400 used to map virtual disks of the virtualization architecture. Each vdisk 235 corresponds to a virtual address space for storage exposed as a disk to the UVMs 210. Illustratively, the address space is divided into equal sized units called virtual blocks (vblocks). A vblock is a chunk of pre-determined storage, e.g., corresponding to a virtual address space of the vdisk that is used as the basis of metadata block map structures (maps) described herein. The data in each vblock is physically stored on a storage device in units called extents. Extents may be written/read/modified on a sub-extent basis (called a slice) for granularity and efficiency. A plurality of extents may be grouped together in a unit called an extent group. Each extent and extent group may be assigned a unique identifier (ID), referred to as an extent ID and extent group ID, respectively. An extent group is a unit of physical allocation that is stored as a file on the storage devices, which may be further organized as an extent store.

Illustratively, a first metadata structure embodied as a vdisk map 410 is used to logically map the vdisk address space for stored extents. Given a specified vdisk and offset, the logical vdisk map 410 may be used to identify a corresponding extent (represented by extent ID). A second metadata structure embodied as an extent ID map 420 is used to logically map an extent to an extent group. Given a specified extent ID, the logical extent ID map 420 may be used to identify a corresponding extent group containing the extent. A third metadata structure embodied as an extent group ID map 430 is used to map a specific physical storage location for the extent group. Given a specified extent group ID, the physical extent group ID map 430 may be used to identify information corresponding to the physical location of the extent group on the storage devices such as, for example, (1) an identifier of a storage device that stores the extent group, (2) a list of extent IDs corresponding to extents in that extent group, and (3) information about the extents, such as reference counts, checksums, and offset locations.

Figure 5A:
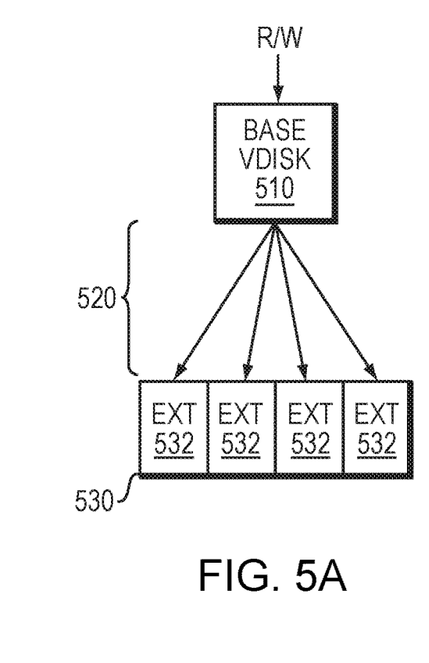
FIGS. 5A-5C are block diagrams of an exemplary mechanism used to create a snapshot of a vdisk.
Figure 5B:
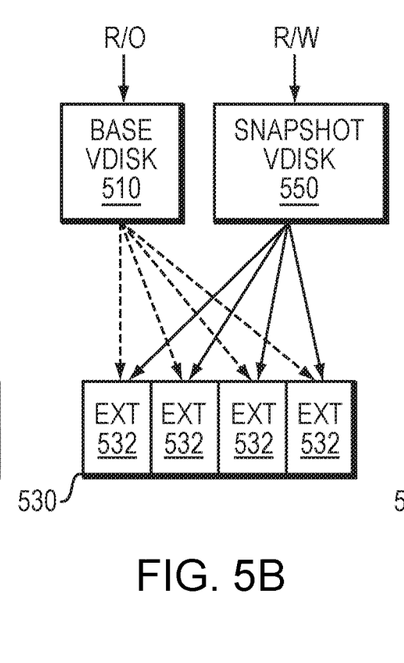
Figure 5C:
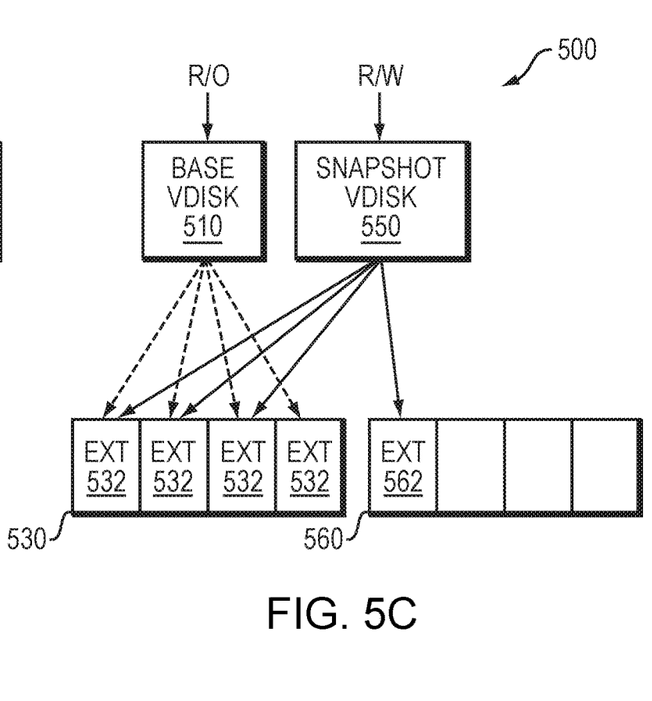

In an embodiment, CVM 300 and DSF 250 cooperate to provide support for snapshots, which are point-in-time copies of storage objects, such as files, LUNs and/or vdisks. FIGS. 5A-5C are block diagrams of an exemplary mechanism 500 used to create a snapshot of a virtual disk. Illustratively, the snapshot may be created by leveraging an efficient low overhead snapshot mechanism, such as the redirect-on-write algorithm. As shown in FIG. 5A, the vdisk (base vdisk 510) is originally marked read/write (R/W) and has an associated block map 520, a metadata mapping with pointers that reference (point to) the extents 532 of an extent group 530 storing data of the vdisk on storage devices of DSF 250. Advantageously, associating a block map with a vdisk obviates traversal of a snapshot chain, as well as corresponding overhead (e.g., read latency) and performance impact.

To create the snapshot (FIG. 5B), a new vdisk (snapshot vdisk 550) is created by sharing the block map 520 with the base vdisk 510. This feature of the low overhead snapshot mechanism enables creation of the snapshot vdisk 550 without the need to immediately copy the contents of the base vdisk 510. Notably, the snapshot mechanism uses redirect-on-write such that, from the UM perspective, I/O accesses to the vdisk are redirected to the snapshot 550 which now becomes the (live) vdisk and the base vdisk 510 becomes the point-in-time copy, i.e., an "immutable snapshot," of the vdisk data. The base vdisk 510 is then marked immutable, e.g., read-only (R/O), and the snapshot vdisk 550 is marked as mutable, e.g., R/W, to accommodate new writes and copying of data from the base vdisk to the snapshot vdisk. A series of snapshots may be similarly created to form a vdisk snapshot chain. Note that each vdisk includes its own metadata structures 400 used to identify and locate extents owned by the vdisk. As such, vblocks of the vdisk may be referenced by the snapshots. As new data is written, the snapshots and vdisk diverge resulting in fragmentation of, e.g., the vdisk maps.

in one or more embodiments, the contents of various vblocks as well as metadata structures of the snapshot vdisk 550 may be populated at a later time using, e.g., a lazy copy procedure in which various vblock contents of the base vdisk 510 are copied to the snapshot vdisk 550 over time. Another procedure that may be employed to populate the snapshot disk 550 waits until there is a request to write (i.e., modify) data in the snapshot vdisk 550 (FIG. 5C). Here, the block map 520 of the snapshot vdisk 550 directly references a new extent 562 of a new extent group 560 storing the new data on storage devices of DSP 250. However, if the requested write operation only overwrites a small portion of the existing data in the base vdisk 510, fragmentation occurs so that map metadata increases. As a result, more read operations are required to read (gather) the data contents of the vdisk due to lack of contiguousness of the fragments on the storage devices.

Figure 6:
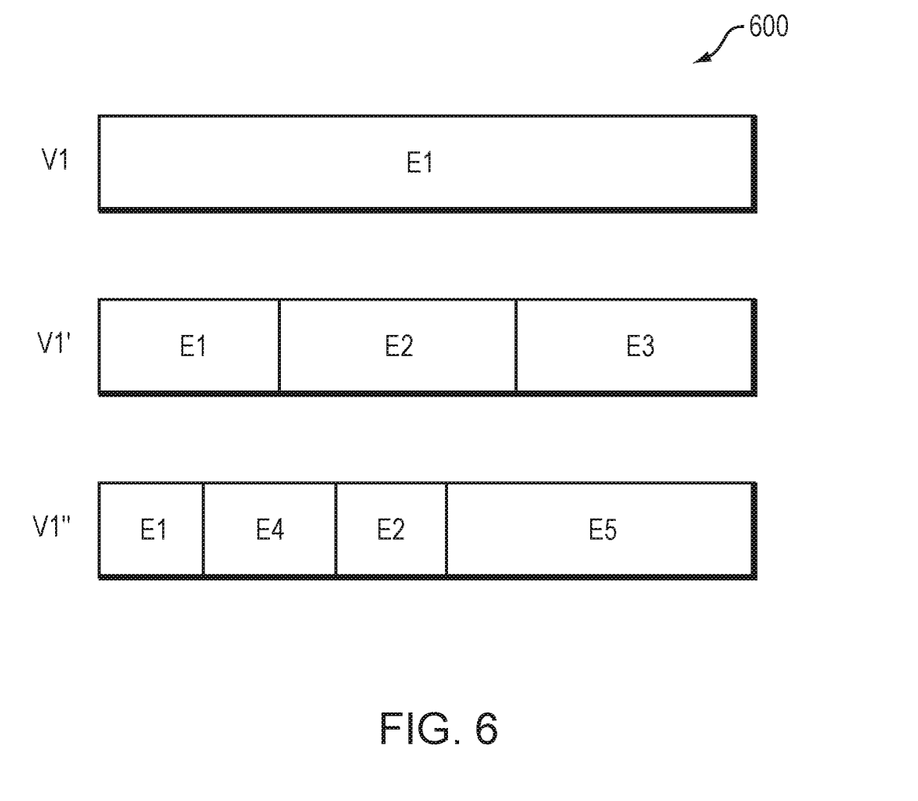
FIG. 6 is a block diagram illustrating fragmentation of a virtual block (vblock) of a vdisk within various snapshots of a vdisk snapshot chain.

As noted, the snapshot mechanism described above may be used to create a series of snapshots that form a vdisk snapshot chain. However, repeated snapshot creation and subsequent write operations, issued by an application executing on the UVM to the vblocks of the newest snapshot in the vdisk snapshot chain, may lead to fragmentation of the vdisk as portions of the vdisk are overwritten in the snapshot. FIG. 6 is a block diagram illustrating fragmentation of a vblock of a vdisk within various snapshots of a vdisk snapshot chain 600. Here, vblock V1 is an original vblock of a vdisk having one extent E1. After creation of a first snapshot of the vdisk, the vblock becomes an immutable parent vblock V1 and the snapshotted vblock becomes a first R/W child vblock V1'. The application then issues a write operation to overwrite (change) certain portions of E1 with additional extents (e.g., E2, E3), wherein E2 is at a first offset and length within the vblock, and E3 is at a second offset and length. The portion of extent E1 that is not changed in the vblock V1' has no data but rather a metadata descriptor (pointer) that references the parent vblock V1. Another snapshot is then created as a second R/W child vblock V1" and additional overwrites by the application to this vblock results in further additional extents (e.g., E4, E5). Thus, the vdisk snapshot chain 600 is formed from the series of snapshots and the vblock has transformed from one extent (e.g., E1) to four extents (e.g., E1, E2, E4, E5). As more snapshots are created, the number of extents in the vblock may increase, thereby leading to fragmentation of the vdisk (and vblock) yielding an increase in the associated map metadata.

A problem with vdisk fragmentation is that a substantial amount of metadata descriptors ("overhead") are needed to describe (reference) the extents of the vblock that are unchanged within the vdisk snapshot chain 600, which is directly related to a number of I/O accesses needed to read the vdisk (i.e., the greater the fragments, the greater the number of reads to gather the fragments). Moreover, the data content of these extents may be stored randomly at various physical locations within extent groups of the storage devices of the extent store. When retrieving data of the extents (extent data) for a fragmented vdisk, the application may issue a substantial amount of I/O accesses, such as read operations, to a read subsystem, which accesses the data from the extent store at the various physical locations, thereby introducing read latencies. The random storage of data associated with vdisk fragmentation may therefore lead to an increase in metadata overhead as well as a decrease in read performance.

Figure 7:
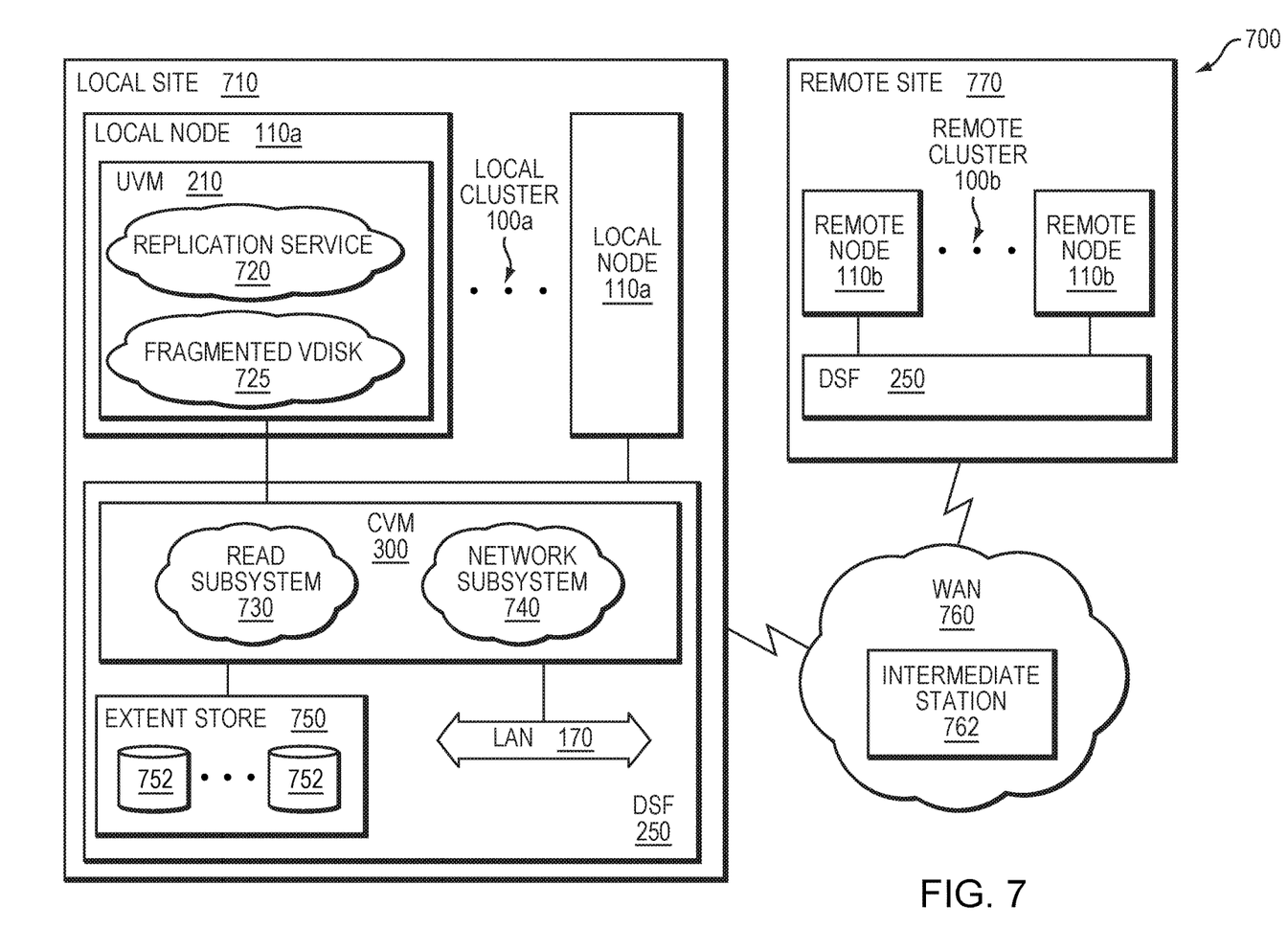
FIG. 7 is a block diagram of a replication topology configured to replicate data from a local node of a local cluster on a local site to a remote node of a remote cluster on a remote site of a disaster recovery environment.

FIG. 7 is a block diagram of a replication topology 700 configured to replicate data from a local node 110a of a local cluster 100a on a local site 710 to a remote node 110b of a remote cluster 100b on a remote site 770 of a disaster recovery (DR) environment. A replication service 720, such as an extent-based asynchronous replication service, executing in UVM 210 may operate to replicate extent data and its associated metadata descriptors for complete extents of a fragmented vdisk 725 from the local site 710 to the remote site 770 if the extent is not present on the remote site. That is, the extent data and associated metadata descriptors for the entire extent are replicated (e.g., as replication data) even if only a portion of the extent is logically valid for the vdisk 725 being replicated. A read subsystem 730 of CVM 300 on the local site 710 reads (retrieves) data from the extents of the snapshots (e.g., of a vdisk snapshot chain 600) for the fragmented vdisk 725 stored at various locations on storage devices 752 of extent store 750 and sends the replication data to a network subsystem 740, which transmits that data within packets to the remote site 770. The data packets are transmitted over a WAN 760 that typically spans long distances and has variable latencies due to, e.g., traversal of one or more intermediate stations 762 (e.g., routers/switches) connecting physical network wires/cables, as well as possible dropping, losing or corruption of packets.

If the rate of data retrieved by the read subsystem 730 from the extent store 750 is slower (e.g., due to overhead and adverse read performance) than the rate of data transmitted by the network subsystem 740 over the WAN 760, then the network/WAN (e.g., the network bandwidth) may be underburdened waiting for more data to transmit. Moreover, the retrieved replication data may be temporarily stored in memory until transmission over the WAN 760, which consumes hardware resources. Yet if the rate of data transmission by the network subsystem 740 is faster than the rate of data retrieval by the read subsystem 730 from the extent store 750, then the extent store 750 (e.g., the extent store bandwidth) may be over-burdened by continuously servicing the replication data, while possibly having to delay servicing of I/O accesses issued by an application for other services. Accordingly, there is a need to balance the rate of data retrieval with the rate of data transmission during replication between the local site 710 and remote site 770.

The embodiments described herein are directed to a dynamic feedback technique configured to improve data replication performance by balancing rates of data retrieval and data transmission of a fragmented virtual disk replicated between nodes of clusters on a local site and a remote site of a DR environment. The storage resources include storage devices 752 of extent store 750, whereas the network includes WAN 760 connecting the local site 710 and remote site 770. The dynamic (real-time) feedback technique employs a virtual memory buffer configured to balance the data retrieval and transmission rates at a source of replication according to I/O access (e.g., read access) demands on the extent store (e.g., a number of read accesses and aggregate extent store bandwidth) and network throughput as manifested by an available free space (i.e., emptiness) of the virtual buffer.

In an embodiment, the technique may employ existing memory buffer capacity deployed in a storage (read) subsystem and a network subsystem as the virtual memory buffer to balance data storage retrieval with network transmission by controlling use of the existing (actual) buffer capacity represented as an available free space of the virtual memory buffer. Notably, the virtual memory buffer is an aggregation of actual buffer capacity in the read and network subsystems without allocation or reservation from other specific memory of the local site. As such, the retrieval and transmission rates (e.g., throughput) of the read and network subsystems are controlled by a single quantity, i.e., the available free space of the virtual memory buffer.

Figure 8:
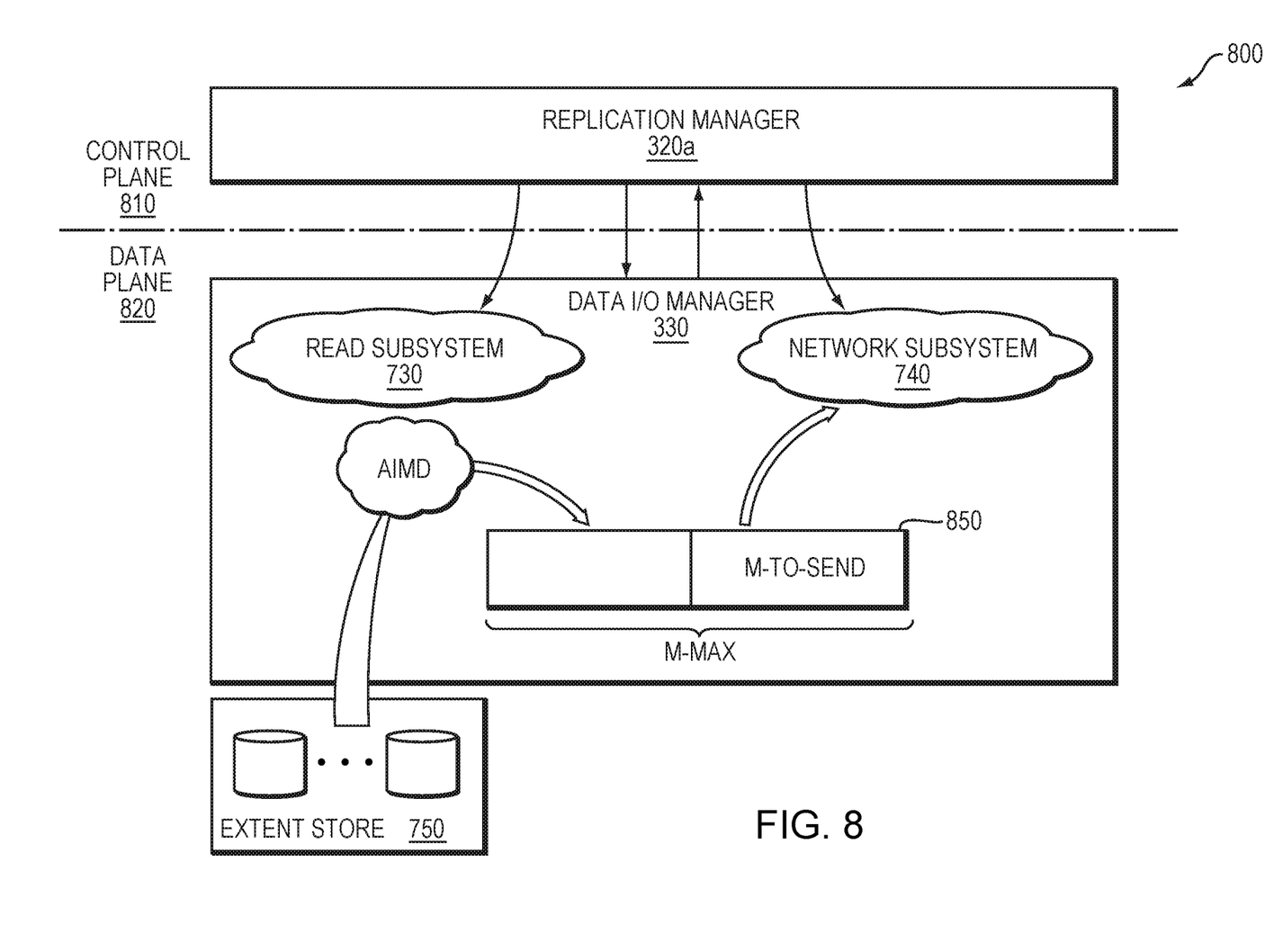
FIG. 8 is a diagram illustrating a dynamic feedback technique.

FIG. 8 is a diagram illustrating the dynamic feedback technique 800. In an embodiment, replication manager 320a runs in a control plane 810 of the virtualization architecture 200 and interacts with data I/O manager 330 running in a data plane 820 of the architecture to provide the actual DR replication associated with the replication service. Notably, the data I/O manager 330 implements the dynamic feedback technique within the data plane 820 of the virtualization architecture 200. To that end, data I/O manager 330 includes read subsystem 730 configured to interface with the storage devices 752 of extent store 750 and network subsystem 740 configured to interface with the network (e.g., WAN 760). As part of the control plane, the replication manager 320a merely provides instructions and information identifying the data and metadata of the fragmented vdisk 725 involved in the DR replication to the data I/O manager 330 and, thus, does not manage the feedback technique implemented by the data I/O manager 330. In effect, the replication manager initiates the replication by directing the data I/O manager to perform actual data transfer to implement the replication. In other words, with the possible exception of completion status regarding the data retrieval and transmission, the replication manager 320*a* is unaware of the actual data flow involved with DR replication addressed by the dynamic feedback technique 800.

Specifically, the replication manager 320*a* may issue instructions to the data I/O manager 330 directed to configuration (set up) of the local site 710 as the source of replication and the remote site 770 as a destination of replication. The replication manager 320*a* may also provide information to the data I/O manager 330 identifying the data and metadata (e.g., a list of vblocks and associated metadata mapping structures of the snapshot chain 600) of the fragmented vdisk 725 involved in the replication (i.e., "replication data"). The read subsystem 730 uses the vblock/metadata information and instructions to issue reads to the extent store 750 to retrieve the replication data and load the data into virtual memory buffer 850 derived from existing memory buffer capacity of the read and network subsystems. As noted, the virtual buffer is an aggregation of the actual buffer capacity in the read and storage subsystems without specific allocation or reservation from other specific memory. In addition, the network subsystem 740 uses the information and instructions to transmit the replication data to a location, e.g., an IP address of a remote CVM 300, at the remote site 770.

In an embodiment, a first stage of the dynamic feedback technique 800 involves interaction between the (local) read subsystem 730 and (local) network subsystem 740 of the CVM 300 within the local node 110*a* at the local site 710. Illustratively, interaction between the local read subsystem 730 and local network subsystem 740 may be implemented through the exchange of messages using an inter-process communication (IPC) mechanism. A second stage of the technique involves interaction among peer CVMs 300 on nodes 110*a,b* at the local site 710 and remote site 770. For example, interaction between the local network subsystem 740 on the local site 710 and a peer remote network subsystem (not shown) on the remote site 770 may be effected through the exchange of remote procedure call (RPC) messages, such as a send/receive RPC, effectuate replication in the DR environment.

Illustratively, the virtual memory buffer 850 used in the feedback technique is fixed sized and configured to store a predetermined amount (e.g., 64 MB) of data, although the buffer may be alternatively configured as a counter that increases when data is added to the virtual buffer and decreases when data is removed from the virtual buffer. In response to an instruction issued by an application (e.g., replication service 720) running on UVM 210 to initiate DR replication, the read subsystem 730 at the source of replication (i.e., the local site 710) loads data of the fragmented vdisk 725 retrieved from the extent store 750 into the virtual memory buffer 850 (an existing buffer of the storage subsystem forming part of the virtual memory buffer), which may involve a large number of I/O (i.e., read) accesses according to an amount of fragmentation of the vdisk. The network subsystem 740 of the local site 710 then forwards the loaded data from the virtual buffer 850 to the network (WAN 760) for transmission to the destination of replication (i.e., the remote site 770). According to the technique, the emptiness of the virtual buffer 850 may be determined by the rate at which the network subsystem 740 is able to transmit the data over the network/WAN to the remote site 770 which, in turn, determines the rate at which data is retrieved by the read subsystem 730 from the extent store 750. Essentially, a rate of data retrieval from the extent store 750 is proportional to the emptiness of the virtual buffer 850, which provides real-time feedback to the read subsystem 730 from the network subsystem 740. That is, a current throughput of the network determines the emptiness (e.g., an amount of free space) of the virtual buffer which drives demand for the read subsystem to retrieve data from the vdisk.

For example, if the virtual memory buffer 850 is substantially empty because the data transmission rate of the network is high (fast) i.e., actual network buffers forming part of the virtual buffer are empty), the read subsystem 730 may increase the data retrieval rate by, e.g., issuing more I/O accesses, such as read operations, to the extent store 750. The read subsystem may service accesses from different sources such that the extent store 750 may be unable to handle (process) the increased rate of read operations and, as a result, may become congested or saturated. In response, a congestion avoidance algorithm may be invoked to adjust (control) the rate at which data can be suitably retrieved from the extent store, as well as the read demand made to the read subsystem as determined from the emptiness of the virtual buffer. Notably, both the congestion avoidance algorithm and balance of data storage retrieval with network data transmission may be driven by the emptiness of the virtual buffer. In an embodiment, the congestion avoidance algorithm is an additive-increase/multiplicative-decrease (AIMD) algorithm, although other congestion avoidance algorithms may be advantageously used with the embodiments herein.

According to the technique, the emptiness (i.e., a degree of free space) of the virtual memory buffer 850 may be manifested as either a percentage or numerical amount of free space in the virtual buffer using values that are determined and processed by the read subsystem 730. Illustratively, the values include a maximum value (M-Max) of the virtual memory buffer 850 and an amount of data to send to the network subsystem 740 (M-to-Send). The read subsystem 730 uses these values to arrive at the virtual buffer emptiness, illustratively calculated as (M-Max)–(M-to-Send), which operates as an error feedback to drive the demand to the read subsystem. As such, these calculations are used to drive a dual-level feedback mechanism of the technique, wherein a primary level involves feedback of the real time (dynamically changing) emptiness of the virtual memory buffer 850 to control read demand to the read subsystem 730 and a secondary level that involves feedback configured to control the read subsystem performance (e.g., I/O access rate) to the extent store 750 using the congestion avoidance algorithm. In effect, the emptiness of the virtual buffer (e.g., expressed as M-Max minus M-to-Send) drives the dual-level feedback mechanism.

Furthermore, the technique automatically handles network back pressure by controlling the read subsystem as the virtual buffer captures the network back pressure, which increases actual memory buffer use in the network and read sub-systems. A plurality of considerations may impact the emptiness of the virtual memory buffer 850 and resulting attempts to match the bandwidth performances of the local site 710 and remote site 770. As noted, the vdisk snapshot chain 600 of the fragmented vdisk 725 is an initial consideration that may limit the (read) bandwidth at the local read subsystem 730. Here, the extent store 750 may convey the bandwidth limitation as throughput pressure exerted back to the read subsystem 730 through invocation of the congestion avoidance algorithm.

Another consideration involves throughput pressure exerted by the remote site 770 as a result of limited network bandwidth. Specifically, the rate of data transmission experienced by the network subsystem 740 on the local site 710 may be impacted by activity of the WAN 760 and the remote network subsystem on the remote site 770. For example, if the WAN and/or remote network subsystem is oversubscribed, network bandwidth may be impacted in the form of, e.g., dropping of transmitted packets at intermediate stations 762 of the WAN 760 and/or lack of acknowledgments of the packets by a network protocol stack of the remote site 770. As a result, variable network latencies may arise that prevent the remote network subsystem from accepting the replication data transmitted from the local site 710 and that manifest as back pressure exerted by the remote site 770 reducing throughput. The throughput back pressure from the remote site 770, in turn, impacts the emptiness of the virtual memory buffer 850 on the local site 710, which is fed back proportionally to the local read subsystem 730 and results in a reduction in the amount of data (extents) retrieved from the extent store 750 needed to fill the free space of the virtual buffer 850.

Each site 710, 770 may further employ an I/O performance profile configured to facilitate the replication service 720. For instance, the local site 710 may allocate a predetermined threshold of read bandwidth (e.g., 5% of read subsystem bandwidth or I/O as per second capacity) to the (local) extent store 750 for replication, which is implemented as a background task. Similarly, the remote site 770 may allocate a predetermined threshold of write bandwidth to its (remote) extent store for the background replication task. These thresholds may manifest as further latencies and throughout pressures that need to be considered and accounted for when providing the replication service 720. Notably, the dynamic feedback technique 800 accommodates throughput pressures in real time, which pressures extend from applications executing on the local and remote sites to the subsystems of the data I/O managers executing in the CVMs of the sites, as well as any intermediate variable latencies associated with the network.

Illustratively, the dynamic technique conveys feedback from the network subsystem 740 to the read subsystem 730 as throughput pressures manifested as an amount of data to retrieve from the extent store 750 of the local site 710 in order to balance the data storage retrieval and network data transmission rates for the replication data in the virtual memory buffer 850. In the absence of the feedback, the read subsystem 730 may issue a series of read operations to retrieve a constant amount of vblocks (extents) from the extent store 750. However, depending on an amount of fragmentation of the vblocks, the read subsystem 730 may spawn additional threads of execution (threads) to issue the read operations in parallel (i.e., parallel I/O accesses) to the various locations (extent groups) on the storage devices 752. That is, when the amount of fragmentation of the vdisk exceeds a fragmentation threshold, additional threads are spawned in the data manager 330 to perform increased read accesses to the extent store while an aggregate throughput of the extent store remains available. However, the resulting parallel I/O accesses may increase the throughput pressure on the extent store 750 and trigger the congestion avoidance algorithm to reduce (throttle) the number of 113 accesses actually serviced by the extent store.

Other considerations involve the type of storage media (e.g., SSD and/or HDD) used to store the vblocks as well as the transfer rate (throughput) associated with the media types. For example, SSDs typically have inconsistent write performance, but consistent random-access performance, whereas HDDs have inconsistent random-access performance, but steadier write performance. As a result of storage tiering, the virtual address space of the fragmented vdisk 725 may extend across the storage devices 752 of the storage pool 160 such that a portion of the vdisk may be resident on SSD 164 and another portion may be resident on HDD 165. According to the feedback technique, the data I/O manager 330 may increase the number of parallel I/O accesses issued to the extent store 750 because of heuristic knowledge of an expected performance throughput. of the storage media on which the vblocks of the fragmented vdisk 725 are resident.

Advantageously, the dynamic feedback technique described herein improves DR replication performance and optimizes resource utilization through direct feedback from a network subsystem to a read subsystem at the source of replication, specifically without need of additional memory resources other than those existing in the read and network subsystems.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
retrieving data of a virtual disk (vdisk) at a data retrieval rate from an extent store via a read subsystem of a local site for replication to a remote site;
transmitting the data at a data transmission rate to the remote site via a network subsystem of the local site; and
balancing the data retrieval and transmission rates using a virtual memory buffer based on buffer capacity within the read and network subsystems according to read access demand on the extent store and network throughput as manifested by an available free space of the virtual memory buffer.

2. The method of claim 1, wherein the available free space of the virtual memory buffer is determined by the rate at which the network subsystem transmits the data over the network to the remote site and the rate at which data is retrieved by the read subsystem from the extent store.

3. The method of claim 1, wherein the available free space of the virtual memory buffer is represented as a counter that increases when data is added to the virtual memory buffer and decreases when data is removed from the virtual memory buffer.

4. The method of claim 1, wherein the virtual memory buffer is an aggregation of memory buffer capacity in the read and network subsystems without allocation from other memory of the local site.

5. The method of claim 1, wherein the rate of data retrieval from the extent store is controlled in proportion to the available free space of the virtual memory buffer to provide real-time feedback to the read subsystem from the network subsystem.

6. The method of claim 1, wherein the available free space of the virtual memory buffer drives a congestion avoidance algorithm to adjust the data retrieval rate and the read access demand of the extent store.

7. The method of claim 1, wherein the read subsystem calculates a difference of (M-Max) and (M-to-Send) to operate as an error feedback to drive the read access demand of the extent store to the read subsystem.

8. The method of claim 1, wherein the available free space of the virtual memory buffer is manifested as one of a percentage or numerical amount of free space in the virtual memory buffer using values that are determined and processed by the read subsystem and wherein the values include a maximum value (M-Max) of the virtual memory buffer and an amount of data to send to the network subsystem (M-to-Send).

9. The method of claim 1, wherein the available free space is used to drive a dual-level feedback mechanism with a primary level providing feedback to control read demand to the read subsystem and a secondary level providing feedback to control performance of the read subsystem to the extent store using a congestion avoidance algorithm.

10. The method of claim 1, wherein the virtual disk is fragmented.

11. The method of claim 10, wherein the virtual disk is fragmented by snapshotting of the virtual disk.

12. A non-transitory computer readable medium including program instructions for execution on a processor, the program instructions configured to:
   retrieve data of a virtual disk at a data retrieval rate from an extent store via a read subsystem of a local site for replication to a remote site;
   transmit the data at a data transmission rate to the remote site via a network subsystem of the local site;
   calculate an amount of free space of a virtual memory buffer based on buffer capacity within the read and network subsystems according to read access demand on the extent store and network throughput; and
   adjust the data retrieval and transmission rates in response to the amount of the free space of the virtual memory buffer.

13. The non-transitory computer readable medium of claim 12, wherein the program instructions configured to calculate the amount of free space of the virtual memory buffer further includes program instructions configured to determine the rate at which the network subsystem transmits the data over the network to the remote site and the rate at which data is retrieved by the read subsystem from the extent store.

14. The non-transitory computer readable medium of claim 12, wherein the program instructions configured to calculate the amount free space of the virtual memory buffer are further configured to increase a counter when data is added to the virtual memory buffer and decrease the counter when data is removed from the virtual memory buffer.

15. The non-transitory computer readable medium of claim 12, wherein the virtual memory buffer is an aggregation of memory buffer capacity in the read and network subsystems without allocation from other memory of the local site.

16. The non-transitory computer readable medium of claim 12, wherein the program instructions are further configured to control the rate of data retrieval from the extent store in proportion to the amount free space of the virtual memory buffer to provide real-time feedback to the read subsystem from the network subsystem.

17. The non-transitory computer readable medium of claim 12, wherein the program instructions are further configured to implement a congestion avoidance algorithm to adjust the data retrieval rate and the read access demand of the extent store driven by the amount free space of the virtual memory buffer.

18. The non-transitory computer readable medium of claim 12, wherein the program instructions are further configured to calculate a difference of (M-Max) and (M-to-Send) to operate as an error feedback to drive the read access demand of the extent store to the read subsystem.

19. The non-transitory computer readable medium of claim 12, wherein the program instructions configured to calculate the amount free space of the virtual memory buffer are further configured to calculate one of a percentage or a numerical amount of free space in the virtual memory buffer using values that are determined and processed by the read subsystem, and wherein the values include a maximum value (M-Max) of the virtual memory buffer and an amount of data to send to the network subsystem (M-to-Send).

20. The non-transitory computer readable medium of claim 12, wherein the program instructions are configured to implement a dual-level feedback mechanism based on the calculated amount of free space with a primary level providing feedback to control read demand to the read subsystem and a secondary level providing feedback to control performance of the read subsystem to the extent store using a congestion avoidance algorithm.

21. The non-transitory computer readable medium of claim 12, wherein the virtual disk is fragmented.

22. The non-transitory computer readable medium of claim 21, wherein the virtual disk is fragmented by snapshotting of the virtual disk.

23. An apparatus comprising:
   an extent store of a local site;
   a node of the local site coupled to the extent store and connected to a remote site, the node having a processor configured to execute program instructions to:
   retrieve data of a virtual disk at a data retrieval rate from the extent store via a read subsystem of the node;
   transmit the data at a data transmission rate to the remote site via a network subsystem of the node;
   calculate an amount of free space of a virtual memory buffer based on buffer capacity within the read and network subsystems according to read access demand on the extent store and network throughput; and
   adjust the data retrieval and transmission rates in response to the amount of the free space of the virtual memory buffer.

24. The apparatus of claim 23, wherein the program instructions to calculate the amount of free space of the virtual memory buffer further include program instructions to determine the rate at which the network subsystem transmits the data over the network to the remote site and the rate at which data is retrieved by the read subsystem from the extent store.

25. The apparatus of claim 23, wherein the program instructions to calculate the amount free space of the virtual memory buffer further include program instructions to increase a counter when data is added to the virtual memory buffer and decrease the counter when data is removed from the virtual memory buffer.

26. The apparatus of claim 23, wherein the virtual memory buffer is an aggregation of memory buffer capacity in the read and network subsystems without allocation from other memory of the local site.

27. The apparatus of claim 23, wherein the program instructions further include program instructions to control the rate of data retrieval from the extent store in proportion to the amount free space of the virtual memory buffer to provide real-time feedback to the read subsystem from the network subsystem.

28. The apparatus of claim 23, wherein the program instructions further include program instructions to implement a congestion avoidance algorithm to adjust the data retrieval rate and the read access demand of the extent store driven by the amount free space of the virtual memory buffer.

29. The apparatus of claim 23, wherein the program instructions further include program instructions to calculate a difference of (M-Max) and (M-to-Send) to operate as an error feedback to drive the read access demand of the extent store to the read subsystem.

30. The apparatus of claim 23, wherein the program instructions to calculate the amount free space of the virtual memory buffer further include program instructions to calculate one of a percentage or a numerical amount of free space in the virtual memory buffer using values that are determined and processed by the read subsystem, and wherein the values include a maximum value (M-Max) of the virtual memory buffer and an amount of data to send to the network subsystem (M-to-Send).

31. The apparatus of claim 23, wherein the program instructions are configured to implement a dual-level feedback mechanism based on the calculated amount of free space with a primary level providing feedback to control read demand to the read subsystem and a secondary level providing feedback to control performance of the read subsystem to the extent store using a congestion avoidance algorithm.

32. The apparatus of claim 23, wherein the virtual disk is fragmented.

* * * * *